(12) United States Patent
Agarwal et al.

(10) Patent No.: US 11,128,939 B2
(45) Date of Patent: Sep. 21, 2021

(54) AUTOMATED SYSTEM PROVISIONING FOR PROGRAMMABLE PHOTONICS FLEX NETWORKS

(71) Applicant: Sterlite Technologies Limited, Aurangabad (IN)

(72) Inventors: Puneet Kumar Agarwal, Gurugram (IN); Vishnu K, Gurugram (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/942,411

(22) Filed: Jul. 29, 2020

(65) Prior Publication Data
US 2021/0037299 A1    Feb. 4, 2021

(30) Foreign Application Priority Data
Jul. 29, 2019  (IN) .............................. 201921030564

(51) Int. Cl.
*H04B 10/00* (2013.01)
*H04Q 11/00* (2006.01)
*H04J 14/02* (2006.01)
*H04J 14/00* (2006.01)

(52) U.S. Cl.
CPC ........ *H04Q 11/0062* (2013.01); *H04J 14/021* (2013.01); *H04Q 2011/0086* (2013.01)

(58) Field of Classification Search
CPC .............. H04J 14/0224; H04J 14/0226; H04J 14/0227; H04J 14/0241; H04J 14/0254; H04J 14/0256; H04J 14/0257; H04J 14/026; H04J 14/0267
See application file for complete search history.

(56) References Cited

U.S. PATENT DOCUMENTS

| | | | |
|---|---|---|---|
| 2014/0044431 A1* | 2/2014 | Hussain | H04J 14/0263 398/79 |
| 2019/0379480 A1* | 12/2019 | Tanzi | H04Q 11/0062 |

* cited by examiner

*Primary Examiner* — Daniel G Dobson

(57) ABSTRACT

The present disclosure provides a method for dynamically allocating an optical channel. The method includes receiving a user input request from a user. In addition, the method includes receiving an OLS spectrum data of the optical channel. Further, the method includes computing one or more configuration parameters for a predefined pair of transponders of one or more transponders based on the user input request and the OLS spectrum data. Furthermore, the method includes configuring the one or more configuration parameters on the predefined pair of transponders of the one or more transponders. Moreover, the user is associated with the one or more transponders. The user input request is associated with the predefined pair of transponders of the one or more transponders. The user input request includes parameters for the optical channel allocation on the predefined pair of transponders.

10 Claims, 2 Drawing Sheets

AUTOMATED SYSTEM PROVISIONING FOR PROGRAMMABLE PHOTONICS FLEX NETWORKS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical network technology and in particular, relates to an automated system provisioning for programmable photonics flex networks.

Description of the Related Art

Over the last few years, internet technology has flourished due to adoption of optical network technology. Demand for internet services has increased due to optical network technology. In addition, the increased demand for internet services has increased user-traffic over optical network technology. Typically, optical network technology utilizes wavelength division multiplexing to allocate a spectrum of group of channels. In addition, wavelength division multiplexing utilizes a flexible grid spectrum technology. Further, the flexible grid spectrum technology provides network operators with additional flexibility to assign the spectrum. Furthermore, the flexible grid spectrum technology breaks the spectrum into small slots (in a range of about 12.5 GHz or 6.25 GHz) compared to 50 GHz used by traditional networks. Moreover, the flexible grid spectrum technology joins contiguous slots to form arbitrary sized blocks of the spectrum. Also, the flexible grid spectrum technology allows transponder devices to utilize high spectral efficiency modulation techniques. Also, the flexible grid spectrum technology has changed allocation limit of traditional wavelength division multiplexing that uses fixed grid technology Also, the flexible grid spectrum technology allocates appropriate-sized spectrum based on traffic generated in optical network technology. Also, the flexible grid spectrum technology reduces guard bands between channels. Also, the flexible grid spectrum technology analyzes parameters associated with an optical line system. Also, the optical line system includes ROADM (reconfigurable optical add-drop multiplexer), transponder, wavelength selective switch (WSS), multiplexing demultiplexing unit (MDU), amplifiers, variable optical attenuator (VOA) and in-line amplifier (ILA) nodes.

However, conventional optical network technology is incapable to configure parameters of the optical line system in real-time. In addition, conventional optical network technology allows the flexible grid spectrum technology to assign grid channels in run-time. Typically, conventional optical network technology requires manual configuration of parameters of the optical line system. In addition, conventional optical network technology requires manual utilization of alien wavelengths in optical networks. Further, manual configuration of alien wavelengths has increased network infrastructure cost on network operators.

In light of the above stated discussion, there is a need for a programmable flex grid unit that overcomes the above stated drawbacks.

BRIEF SUMMARY OF THE INVENTION

In an aspect, the present disclosure provides a method for dynamically allocating an optical channel. The method includes receiving a user input request from a user. In addition, the method includes receiving an OLS spectrum data of the optical channel. Further, the method includes computing one or more configuration parameters for a predefined pair of transponders of one or more transponders based on the user input request and the OLS spectrum data. Furthermore, the method includes configuring the one or more configuration parameters on the predefined pair of transponders of the one or more transponders. Moreover, the user is associated with the one or more transponders. The user input request is associated with the predefined pair of transponders of the one or more transponders. The user input request includes parameters for the optical channel allocation on the predefined pair of transponders.

A primary object of the present disclosure is to provide a programmable flex grid unit to allocate dynamic bandwidth based on user requested bandwidth.

Another object of the present disclosure is to provide the programmable flex grid unit that prevents wastage of bandwidth.

Yet another object of the present disclosure is to provide the programmable flex grid unit that configures physical channel in an automated manner.

Yet another object of the present disclosure is to provide the programmable flex grid unit that continuously monitors and performs re-tuning of an optical line system spectrum during identification of issue generated in the optical line system.

Yet another object of the present disclosure is to provide the programmable flex grid unit that helps in dynamic adjustment of a channel and allows priority traffic of users to remain non-interrupted.

In an embodiment of the present disclosure, the one or more configuration parameters are fine-tuned based on periodic OLS spectrum data of the optical channel. The periodic OLS spectrum data of the optical channel is collected periodically.

In an embodiment of the present disclosure, the user input request parameters includes bitrate, protection type, hardware redundancy, path diversity, types of incoming traffic, maximum allowed service latency, maximum allowed restoration time, start date, end date and time of service.

In an embodiment of the present disclosure, the one or more configuration parameters include channel bandwidth, channel spacing, channel lambda information, channel modulation, channel power, and forward error correction (FEC) configuration. In addition, the one or more configuration parameters includes differential encoder (DE) configuration, current bit error ratio (BER), chromatic dispersion (CD), polarization mode dispersion (PMD) and current channel optical signal to noise ratio (OSNR).

In an embodiment of the present disclosure, the method includes receiving the periodic OLS spectrum data of the optical channel. The periodic OLS spectrum data of the optical channel is collected periodically. In addition, the method includes downsizing of the user input request parameters when the periodic OLS spectrum data is below an optimum OSNR (optical signal to noise ratio) value required by each of the predefined pair of transponders. Further, the optimum OSNR value is defined by sensitivity value for each of the predefined pair of transponders.

In another aspect, the present disclosure provides a network controller for dynamic allocation of the optical channel. The network controller includes a transceiver unit. In addition, the network controller includes a programmable flex grid unit configured to compute the one or more configuration parameters for the predefined pair of transponders of the one or more transponders based on the user input request and the OLS spectrum data. Further, the transceiver unit is configured to receive the user input request for channel allocation from the user through an orchestrator. The user is associated with the one or more transponders. The user input request is associated with the predefined pair of transponders of the one or more transponders. The user input request includes parameters for optical channel allocation on the predefined pair of transponders. Furthermore, the transceiver unit is configured to receive an OLS spectrum data of the optical channel from an optical line system (OLS) spectrum. Moreover, the programmable flex grid unit is configures the one or more configuration parameters on the predefined pair of transponders of the one or more transponders.

In an embodiment of the present disclosure, the programmable flex grid unit is configured for fine tuning the one or more configuration parameters based on periodic OLS spectrum data of the optical channel. The periodic OLS spectrum data of the optical channel is collected periodically.

In an embodiment of the present disclosure, the user input request parameters includes bitrate, protection type, hardware redundancy, path diversity, types of incoming traffic, maximum allowed service latency, maximum allowed restoration time, start date, end date and time of service.

In an embodiment of the present disclosure, the one or more configuration parameters comprising channel bandwidth, channel spacing, channel lambda information, channel modulation, channel power, and forward error correction (FEC) configuration. In addition, the one or more configuration parameters includes differential encoder (DE) configuration, current bit error ratio (BER), chromatic dispersion (CD), polarization mode dispersion (PMD) and current channel optical signal to noise ratio (OSNR).

In an embodiment of the present disclosure, the programmable flex grid unit is configured for downsizing the user input request parameters when the periodic OLS spectrum data is below an optimum OSNR (optical signal to noise ratio) value required by each of the predefined pair of transponders. The optimum OSNR value is defined by sensitivity value for each of the predefined pair of transponders. The periodic OLS spectrum data of the optical channel is collected periodically.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
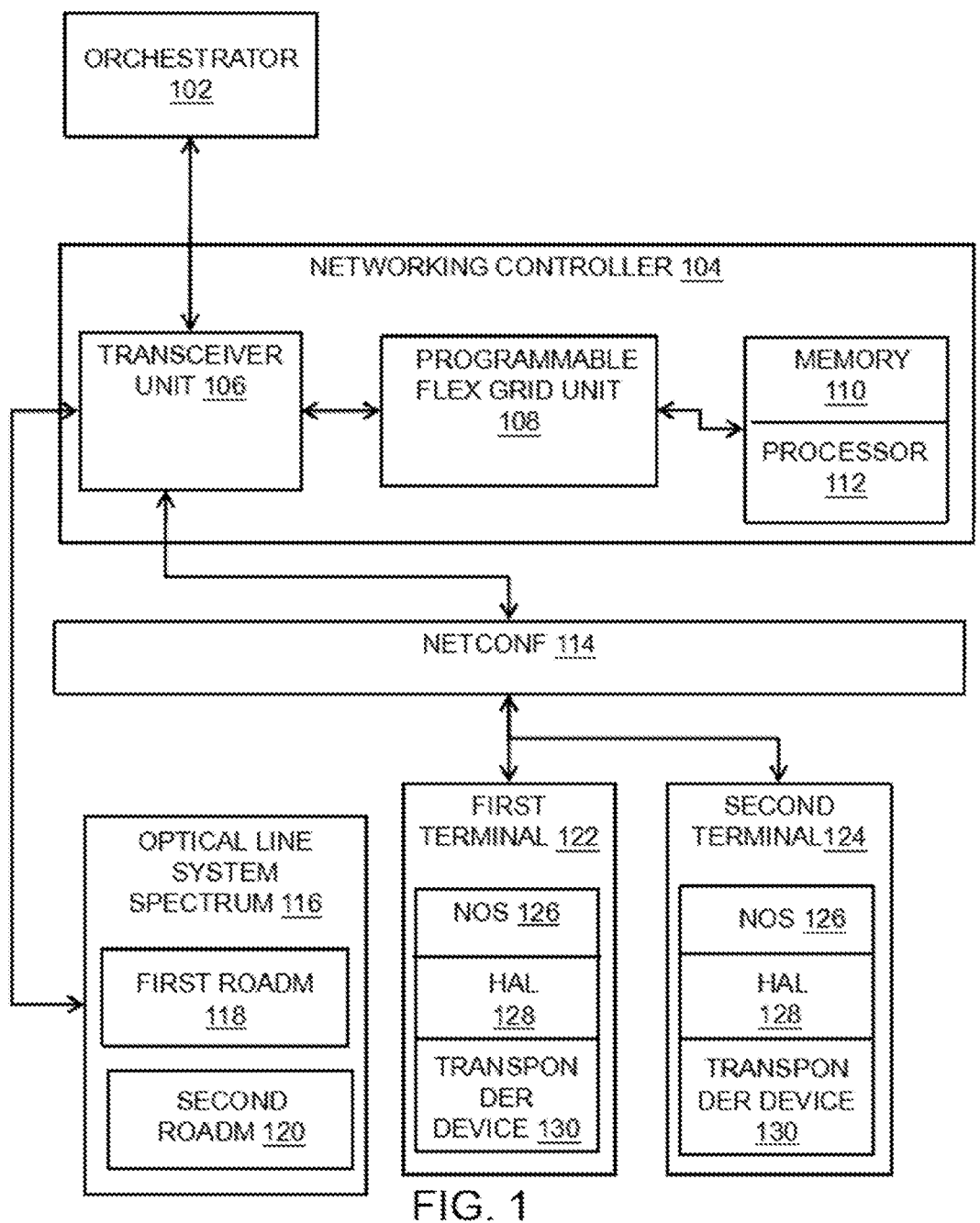
FIG. 1 illustrates an interactive computing environment for dynamically allocating an optical channel with facilitation of a network controller.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Interactive computing environment.
102. Orchestrator.
104. Network controller.
106. Transceiver unit.
108. Programmable flex grid unit.
110. Memory.
112. Processor.
114. NETCONF.
116. Optical line system spectrum.
118. First ROADM.
120. Second ROADM.
122. First terminal.
124. Second terminal.
126. Network operating system (NOS).
128. Hardware abstraction layer (HAL).
130. Transponder device.
200. Flow chart of a method describing steps to dynamically allocate the optical channel.
202. Start step.
204. The step of receiving user input request parameters for an optical channel allocation.
206. The step of receiving an optical line system spectrum data of the optical channel.
208. The step of dynamically computing one or more configuration parameters for a predefined pair of transponders associated with user based on the input request parameters and the optical line system spectrum data.
210. The step of configuring the computed one or more configuration parameters on the predefined pair of transponders.
212. The stop step.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates an interactive computing environment 100 to dynamically allocate an optical channel with facilitation of a network controller 104, in accordance with various embodiments of the present disclosure. The interactive computing environment 100 illustrates an environment suitable for an interactive reception and analysis of a user input request from a user. The interactive computing environment 100 is configured to provide non-interrupted communication based on the user input request.

The interactive computing environment 100 includes an orchestrator 102, the network controller 104, a transceiver unit 106, a programmable flex grid unit 108, a memory 110, and a processor 112. In addition, the interactive computing environment 100 includes NETCONF 114, an optical line system spectrum 116, a first ROADM 118, and a second ROADM 120. Further, the interactive computing environment 100 includes a first terminal 122, a second terminal 124, a network operating system (NOS) 126, a hardware abstraction layer (HAL) 128, and a transponder device 130.

The interactive computing environment 100 includes the orchestrator 102. In general, orchestrator is means by which process is executed, monitored and managed throughout its lifecycle. In addition, orchestration depends on series of workflows that depend on each other to enhance production ecosystem. The orchestrator 102 is associated with the user. In an embodiment of the present disclosure, the user is a new customer who requires one or more services from a vendor. In another embodiment of the present disclosure, the user is existing customer who requires the one or more services from the vendor. In addition, the user provides service configuration to the orchestrator 102. In an embodiment of the present disclosure, the user provides the user input request for the optical channel to the orchestrator 102. In addition, the user input request includes parameters for the optical channel allocation on a predefined pair of transponders of one or more transponders. In an embodiment of the present disclosure, the predefined pair of transponders of the one or more transponders corresponds to the transponder 130 associated with the first terminal 122 and the second terminal 124.

The service configuration includes the user input request parameters. In an embodiment of the present disclosure, the user input request parameters include bitrate, protection type, hardware redundancy, path diversity and the like. In addition, the user input request parameters include but may not be limited to types of incoming traffic, maximum allowed service latency, maximum allowed restoration time, start date, end date and time of service. In an embodiment of the present disclosure, the orchestrator 102 provides the user input request parameters to the network controller 104.

In an example, the user input request parameters include bitrate. In addition, bitrate specifies amount of bandwidth required in the optical channel. Further, bitrate has one or more specifications. Furthermore, the one or more specifications include but may not be limited to fixed, QoS (quality of service) and CoS (class of service). In another example, the user input request parameters include protection type. In addition, protection type specifies type of protection scheme required for particular traffic. In yet another example, the user input request parameters include hardware redundancy. In addition, hardware redundancy specifies a plurality of hardware level redundancies provided to a traffic. Further, the plurality of hardware level redundancies includes but may not be limited to client port level, module level and node level. Furthermore, hardware redundancy avoids shared risk groups (SRGs) in each of end link. In yet another example, the user input request parameters include path diversity. In addition, path diversity specifies an implementation of complete end to end alternate traverse path during potential link failure. In yet another example, the user input request parameters include type of incoming traffic. In addition, type of incoming traffic includes OTL and CAUI.

The interactive computing environment 100 includes the network controller 104. In general, network controller corresponds to software-defined networking architecture that manages flow control for improved network management and application performance. In an embodiment of the present disclosure, the network controller 104 includes a southbound interface (SBI) and an open data model device driver. In general, southbound interface is lower level interface layer of component. In addition, southbound interface is connected with lower layer of northbound interface. Further, southbound interface breaks down concepts into smaller technical details that are specifically geared towards lower layer component within architecture. Furthermore, software-defined networking and southbound interface serves as open flow or alternative protocol specification. Moreover, southbound interface allows network component to communicate with lower level component. In general, open data model device driver is set of relational structures that describe capabilities, configuration state, and statistics for each open flow abstraction. In embodiment of the present disclosure, the network controller 104 includes the transceiver unit 106, the programmable flex grid unit 108, the memory 110, and the processor 112.

The network controller 104 includes the transceiver unit 106. In an embodiment of the present disclosure, the transceiver unit 106 is configured to receive the user input request from the user through the orchestrator 102. In addition, the user input request received from the user is related to the optical channel allocation.

The network controller 104 includes the Memory 110. In an embodiment of the present disclosure, the memory 110 includes computer-storage media in a form of volatile and/or nonvolatile memory. The memory 110 may be removable, non-removable, or a combination thereof. In an embodiment of the present disclosure, the network controller 104 includes the processor 112. In an embodiment of the present disclosure, the processors 112 reads data from various entities such as the memory 110 or I/O components.

The interactive computing environment 100 includes NETCONF 114. In addition, NETCONF 114 corresponds to network configuration protocol. Further, NETCONF 114 installs, manipulates and delete configuration of one or more network devices. Furthermore, the one or more network devices include but may not be limited to hub, switch, router, modem, gateway, bridge, repeater and access point. In general, NETCONF protocol uses mechanism to manage, configure, retrieve and manipulate network devices. In addition, NETCONF provides communication between client and server using RPC based mechanism. Further, server corresponds to network device. Furthermore, NETCONF protocol defines one or more datastores. Moreover, the one or more datastores include candidate, running and startup. Also, NETCONF protocol defines one or more operations. Also, the one or more operations include create, retrieve, update, delete operations to access the one or more datastores.

The interactive computing environment 100 includes the optical line system spectrum 116. In general, optical line system spectrum is open to any transponder device, channel format, and the like. The optical line system spectrum 116 includes the first ROADM 118, and the second ROADM 120. In general, ROADM refers to reconfigurable optical add-drop multiplexer. In addition, ROADM is device that can add, block, pass or redirect modulated infrared (IR) and visible light beams of various wavelengths in fiber optic network. Further, ROADM is used in systems that employ wavelength division multiplexing. In an embodiment of the present disclosure, the open line system spectrum 116 provides an OLS (optical line system) spectrum data of the optical channel to the transceiver unit 106.

The interactive computing environment 100 includes the first terminal 122 and the second terminal 124. In an embodiment of the present disclosure, the first terminal 122 and the second terminal 124 are two nodes for which network needs to be configured as per user requested bandwidth. In an embodiment of the present disclosure, the first terminal 122 and the second terminal 124 facilitates non-interrupted communication. In an embodiment of the present disclosure, the first terminal 122 communicates with the second terminal 124 through the optical line system spectrum 116. The first terminal 122 includes but may not be limited to the network operating system (NOS) 126, the hardware abstraction layer (HAL) 128 and the transponder device 130. The second terminal 124 includes but may not be limited to the network operating system (NOS) 126, the hardware abstraction layer (HAL) 128 and the transponder device 130. In general, network operating system is operating system that is designed to support workstations and personal computers that are connected on local area network. In general, hardware abstraction layer is layer of programming that allows computer operating system to interact with optical hardware devices at abstract level. In general, transponder is device that receives signal and emits different signal in response. In addition, transponder converts electrical signal into optical signal and optical signal to electrical signal.

The network controller 104 includes the programmable flex grid unit 108. The programmable flex grid unit 108 is an automated application. In an embodiment of the present disclosure, the programmable flex grid unit 108 is configured at the network controller 104. The programmable flex grid unit 108 receives the user input request from the user through the orchestrator 102. In an embodiment of the present disclosure, the programmable flex grid unit 108 receives real-time validation from the optical line system spectrum 116. In an embodiment of the present disclosure, the optical line system spectrum 116 validates availability of channels between the first ROADM 118 and the second ROADM 120. In addition, the optical line system spectrum 116 validates availability of channels based on one or more configuration parameters. In addition, the one or more configuration parameters include but may not be limited to channel bandwidth, channel spacing, channel lambda information, channel modulation, channel power, and forward error correction (FEC) configuration. In addition, the one or more configuration parameters include the one or more configuration parameters include differential encoder (DE) configuration, current bit error ratio (BER), chromatic dispersion (CD), polarization mode dispersion (PMD) and current channel optical signal to noise ratio (OSNR).

In general, channel bandwidth of wireless signal determines signal data rate. In addition, high channel bandwidth facilitates fast connection. In general, channel spacing is term used in radio frequency planning. In addition, channel spacing describes frequency difference between adjacent allocated frequency plans. In general, channel lambda is wavelength of light used as physical channel for communication. In addition, lambda falls in C-band of the spectrum is in range of about 1530 nanometer to 1565 nanometer. In general, channel modulation is used to modulate carrier wave light. In addition, channel is modulated in multiple schemes. Further, multiple schemes are used in QPSK, 8QAM, 16 QAM. Furthermore, different channel modulation enables light to carry high amount or data.

In general, forward error correction configuration is technique used to control errors in data transmission over unreliable or noisy communication channels. In general, differential encoder configuration is technique that encodes binary input signal. In general, current bit error ratio is number of bit errors divided by total number of transferred bits during studied time interval.

In general, polarization mode dispersion is form of modal dispersion where two different polarizations of light in waveguide that normally travel at same speed and at different speed. In general, optical signal to noise ratio (OSNR) is measure of ratio of signal power to noise power in optical channel.

The programmable flex grid unit 108 is configured to compute the one or more configuration parameters for the predefined pair of transponders of the one or more transponders based on the user input request and the OLS spectrum data. In addition, the programmable flex grid unit 108 configures the one or more configuration parameters on the predefined pair of transponders of the one or more transponders.

The programmable flex grid unit 108 is configured to fine tune the one or more configuration parameters based on periodic spectrum data of the optical channel. In an embodiment of the present disclosure, the periodic OLS spectrum data of the optical channel is collected periodically.

The programmable flex grid unit 108 is configured to downsize the user input request parameters when the periodic OLS spectrum data is below an optimum OSNR (optical signal to noise ratio) value required by each of the predefined pair of transponders. In addition, the optimum OSNR value is defined by sensitivity value for each of the predefined pair of transponders.

The programmable flex grid unit 108 configures or auto-tunes the one or more configuration parameters over the transponder device 130 based on real-time validation. In an embodiment of the present disclosure, the programmable flex grid unit 108 configures the one or more configuration parameters over the transponder device 130 based on parallel computing and auto-control feedback mechanism. In general, parallel computing is type of computation in which many calculations or execution of processes are carried out simultaneously. In general, auto control feedback mechanism occurs when outputs of system are routed back as inputs as part of chain of cause-and-effect that forms circuit or loop. In an embodiment of the present disclosure, the programmable flex grid unit 108 allocates dynamic bandwidth based on user requested bandwidth. In addition, the programmable flex grid unit 108 avoids wastage of bandwidth. In general, dynamic bandwidth allocation technique allows QoS (quality of service) manager to dynamically change bandwidth allocation based on user requested bandwidth. In an embodiment of the present disclosure, the programmable flex grid unit 108 configures the optical channel in an automatic manner. In an embodiment of the present disclosure, the programmable flex grid unit 108 continuously monitors and performs re-tuning of the optical line system spectrum 116 during identification of issue generated in the optical line system spectrum 116. In addition, the programmable flex grid unit 108 helps in dynamic adjustment of the optical channel and allows user's priority traffic to remain non-interrupted.

The programmable flex grid unit 108 configures right match of a channel spacing on the transponder device 130 based on pre-defined algorithms. The programmable flex grid unit 108 facilitates the channel spacing based on the user input request parameters and real-time validation provided by the optical line system spectrum 116.

The programmable flex grid unit 108 downsizes user requested bandwidth to required bandwidth during deterioration of optical link parameters. In addition, downsizing of user requested bandwidth facilitates non-interrupted communication between the transponder device 130 of the first terminal 122 and the transponder device 130 of the second terminal 124. In an embodiment of the present disclosure, the programmable flex grid unit 108 is used to reduce spectrum efficiency utilization between adjoining channels of the first ROADM 118 and the second ROADM 120. In an embodiment of the present disclosure, the programmable flex grid unit 108 interacts with the first terminal 122, the second terminal 124 and the optical line system spectrum 116 through the open data model device driver. In an example, open data model device driver is driver that make use of open data device models like open config and open ROADM to interact with any device.

In an embodiment of the present disclosure, the programmable flex grid unit 108 is triggered based on the user input request initiated for the optical channel by the user. Further, the user initiates request for the optical channel through the orchestrator 102.

In an embodiment of the present disclosure, the programmable flex grid unit 108 searches for available ports in the transponder device 130 based on request initiated by the user. In an embodiment of the present disclosure, the programmable flex grid unit 108 utilizes a wavelength route map application for identifying optimum optical wavelength (s) from the OLS Spectrum for routing. In an embodiment of the present disclosure, the programmable flex grid unit 108 triggers a wavelength route-map based on availability of each route of one or more routes. In addition, the wavelength route map is triggered with optimum channel spacing required for traffic and queries required for each wavelength of one or more wavelengths available in each link of one or more links. Further, each wavelength of the one or more wavelengths available in each link of the one or more links creates the one or more routes. In an example, each route of the one or more routes is made of the one or more links during concatenation.

In an embodiment of the present disclosure, the wavelength route-map assigns wavelengths into live network. In addition, the wavelength route-map increases spectrum efficiency. Further, the wavelength route-map reduces call blocking probability with minimum latency. Furthermore, the wavelength route-map configures frequency with transponder device 130 through the programmable flex grid unit 108.

In an embodiment of the present disclosure, the programmable flex grid unit 108 monitors the optical channel allocated to the user. In addition, the programmable flex grid unit 108 downsizes user requested bandwidth during deterioration of optical link parameters. Further, user requested bandwidth is downsized to provide non-interrupted communication to the user. In an example, downsizing of user requested bandwidth creates a path for user's priority traffic even in the degraded optical link condition. In an embodiment of the present disclosure, the programmable flex grid unit 108 automatically selects a particular route or a particular wavelength based on user requested bandwidth. In addition, the programmable flex grid unit 108 allows the user to override automatic selection of the particular route or the particular wavelength. Further, the programmable flex grid unit 108 provides flexibility to the user for operating network.

Figure 2:
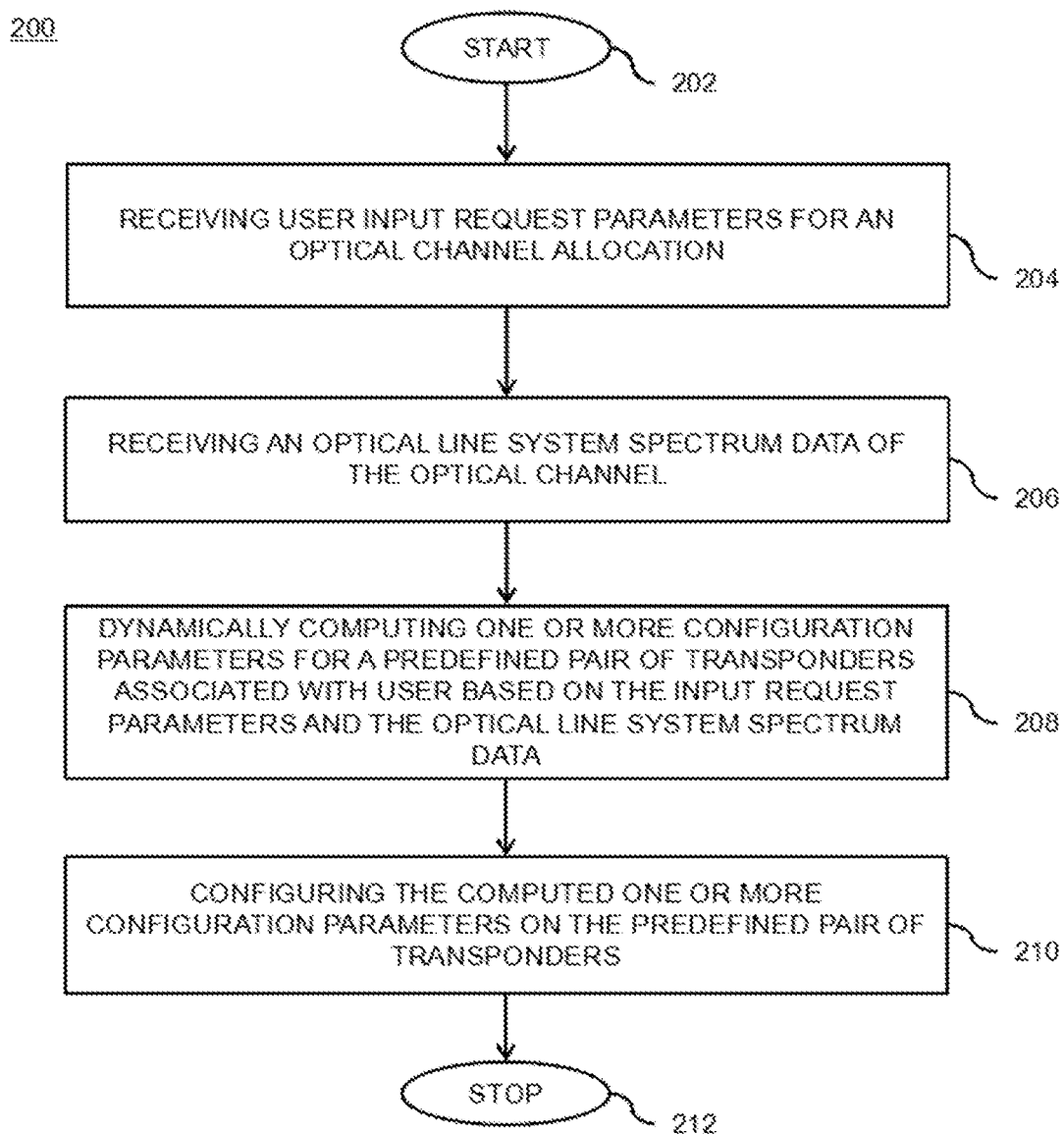
FIG. 2 illustrates a flow chart of a method describing steps for dynamically allocating the optical channel, in accordance with various embodiments of the present disclosure.

FIG. 2 illustrates a flow chart of a method describing steps to dynamically allocate the optical channel 200, in accordance with various embodiments of the present disclosure. The flow chart of the method describing steps to dynamically allocate the optical channel 200 initiates at start step 202. Following the start step 202, at step 204, the method includes receiving the user input request from the user. In addition, the user is associated with one or more transponders. Further, the user input request is associated with the predefined pair of transponders of the one or more transponders. Furthermore, the user input request includes parameters for the optical channel allocation on the predefined pair of transponders. Moreover, the predefined pair of transponders of the one or more transponders is the transponder 130 associated with the first terminal 122 and the second terminal 124.

At step 206, the method includes receiving the OLS (optical line system) spectrum data of the optical channel. At step 208, the method includes computing the one or more configuration parameters for the predefined pair of transponders of the one or more transponders based on the user input request and the OLS spectrum data. At step 210, the method includes configuring the one or more configuration parameters on the predefined pair of transponders of the one or more transponders. The flow chart terminates at stop step 212.

The present invention has various advantages over the prior art. The present invention provides the programmable flex grid unit to allocate dynamic bandwidth based on user requested bandwidth. In addition, the programmable flex grid unit avoids wastage of bandwidth. Further, the programmable flex grid unit configures physical channel in the automatic manner. Furthermore, the programmable flex grid unit continuously monitors and performs re-tuning of the optical line system spectrum during identification of issue generated in the optical line system spectrum. Moreover, the programmable flex grid unit helps in dynamic adjustment of the optical channel and allows user's priority traffic to remain non-interrupted.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for dynamically allocating an optical channel, the method comprising:
    receiving a user input request from a user, wherein the user is associated with one or more transponders, wherein the user input request is associated with a predefined pair of transponders of the one or more transponders, wherein the user input request comprises parameters for the optical channel allocation on the predefined pair of transponders;
    receiving an OLS spectrum data of the optical channel;
    computing one or more configuration parameters for the predefined pair of transponders of the one or more transponders, the one or more configuration parameters are computed based on the user input request and the OLS spectrum data; and
    configuring the one or more configuration parameters on the predefined pair of transponders of the one or more transponders.

2. The method as recited claim 1, further comprising fine tuning the one or more configuration parameters based on periodic OLS spectrum data of the optical channel, wherein the periodic OLS spectrum data of the optical channel is collected periodically.

3. The method as recited in claim 1, wherein the user input request parameters comprising bitrate, protection type, hardware redundancy, path diversity, types of incoming traffic, maximum allowed service latency, maximum allowed restoration time, start date, end date and time of service.

4. The method as recited in claim 1, wherein the one or more configuration parameters comprising channel bandwidth, channel spacing, channel lambda information, channel modulation, channel power, and forward error correction (FEC) configuration, wherein the one or more configuration parameters comprising differential encoder (DE) configuration, current bit error ratio (BER), chromatic dispersion (CD), polarization mode dispersion (PMD) and current channel optical signal to noise ratio (OSNR).

5. The method as claimed in claim 1, further comprising:
    receiving the periodic OLS spectrum data of the optical channel, wherein the periodic OLS spectrum data of the optical channel is collected periodically; and
    downsizing the user input request parameters when the periodic OLS spectrum data is below an optimum OSNR (optical signal to noise ratio) value required by each of the predefined pair of transponders,
    wherein the optimum OSNR value is defined by sensitivity value for each of the predefined pair of transponders.

6. A network controller (104) for dynamic allocation of an optical channel, wherein the network controller (104) comprising:
    a transceiver unit (106), wherein the transceiver unit (106) is configured for receiving a user input request for channel allocation from a user through an orchestrator (102), wherein the user is associated with one or more transponders, wherein the user input request is associated with a predefined pair of transponders of the one or more transponders, wherein the user input request comprises parameters for optical channel allocation on the predefined pair of transponders,
    wherein the transceiver unit (106) is configured for receiving an OLS spectrum data of the optical channel from an optical line system (OLS) spectrum (116); and
    a programmable flex grid unit (108), wherein the programmable flex grid unit (108) is configured for computing one or more configuration parameters for the predefined pair of transponders of the one or more transponders based on the user input request and the OLS spectrum data,
    wherein the programmable flex grid unit (108) configures the one or more configuration parameters on the predefined pair of transponders of the one or more transponders.

7. The network controller (104) as claimed in claim 6, wherein the programmable flex grid unit (108) is configured for fine tuning the one or more configuration parameters based on periodic OLS spectrum data of the optical channel, wherein the periodic OLS spectrum data of the optical channel is collected periodically.

8. The network controller (104) as claimed in claim 6, wherein the user input request parameters comprising bitrate, protection type, hardware redundancy, path diversity, types of incoming traffic, maximum allowed service latency, maximum allowed restoration time, start date, end date and time of service.

9. The network controller (104) as claimed in claim 6, wherein the one or more configuration parameters comprising channel bandwidth, channel spacing, channel lambda information, channel modulation, channel power, and forward error correction (FEC) configuration, wherein the one or more configuration parameters comprising differential encoder (DE) configuration, current bit error ratio (BER), chromatic dispersion (CD), polarization mode dispersion (PMD) and current channel optical signal to noise ratio (OSNR).

10. The network controller (104) as claimed in claim 6, wherein the programmable flex grid unit (108) is configured for downsizing the user input request parameters when the periodic OLS spectrum data is below an optimum OSNR (optical signal to noise ratio) value required by each of the predefined pair of transponders, wherein the optimum OSNR value is defined by sensitivity value for each of the predefined pair of transponders, wherein the periodic OLS spectrum data of the optical channel is collected periodically.

* * * * *